United States Patent
Wang

(10) Patent No.: US 11,231,713 B2
(45) Date of Patent: Jan. 25, 2022

(54) METHOD FOR PROVIDING VEHICLE INFORMATION, DEVICE AND STORAGE MEDIUM

(71) Applicant: BAIDU ONLINE NETWORK TECHNOLOGY (BEIJING) CO., LTD., Beijing (CN)

(72) Inventor: Ya Wang, Beijing (CN)

(73) Assignee: Apollo Intelligent Connectivity (Beijing) Technology Co., Ltd., Beijing (CN)

(*) Notice: Subject to any disclaimer, the term of this patent is extended or adjusted under 35 U.S.C. 154(b) by 190 days.

(21) Appl. No.: 16/669,018

(22) Filed: Oct. 30, 2019

(65) Prior Publication Data

US 2020/0133278 A1 Apr. 30, 2020

(30) Foreign Application Priority Data

Oct. 30, 2018 (CN) .......................... 201811280718.5

(51) Int. Cl.
*G05D 1/02* (2020.01)
*G06Q 10/06* (2012.01)
(Continued)

(52) U.S. Cl.
CPC ........... *G05D 1/0212* (2013.01); *G01C 21/20* (2013.01); *G05D 1/0276* (2013.01);
(Continued)

(58) Field of Classification Search
CPC .............. G05D 1/0212; G05D 1/0276; G05D 2201/0213; G01C 21/20; G06Q 10/06311;
(Continued)

(56) References Cited

U.S. PATENT DOCUMENTS

2011/0093305 A1* 4/2011 Alexander ....... G06Q 10/06311
705/7.13

FOREIGN PATENT DOCUMENTS

| CN | 103236179 A | 8/2013 |
| CN | 105893951 A | 8/2016 |

(Continued)

OTHER PUBLICATIONS

European Patent Application No. EP19206159.6, extended Search and Opinion dated Jan. 8, 2020, 8 pages.

(Continued)

*Primary Examiner* — Rodney A Butler
(74) *Attorney, Agent, or Firm* — Lathrop GPM LLP

(57) ABSTRACT

The embodiments of the present disclosure provide a method and an apparatus for providing vehicle information, a device and a storage medium for implementing the method. The method includes: acquiring a first time period expected for a first vehicle to wait before supplement of energy for the first vehicle is to be commenced; determining a second time period expected to be required during the supplement of the energy for the first vehicle based on an amount of the energy to be supplemented for the first vehicle; determining a third time period expected to require for completing the supplement of the energy for the first vehicle based on the first time period and the second time period; and providing the third time period.

14 Claims, 4 Drawing Sheets

(51) Int. Cl.
  *G07C 5/02* (2006.01)
  *G01C 21/20* (2006.01)
  *B60S 5/02* (2006.01)
(52) U.S. Cl.
  CPC ......... *G06Q 10/06311* (2013.01); *G07C 5/02* (2013.01); *B60S 5/02* (2013.01); *G05D 2201/0213* (2013.01)
(58) Field of Classification Search
  CPC .. G06Q 10/00; G07C 5/02; B60S 5/02; G08G 1/096725
  See application file for complete search history.

(56) References Cited

FOREIGN PATENT DOCUMENTS

| | | | |
|---|---|---|---|
| CN | 108431860 A | | 8/2018 |
| CN | 108615388 A | | 10/2018 |
| JP | 2011214930 A | * | 10/2011 |
| KR | 20180052806 A | | 5/2018 |

OTHER PUBLICATIONS

Chinese Patent Application No. CN201811280718.5 Office Action dated Mar. 10, 2020, 10 pages.
Chinese Patent Application No. CN201811280718.5 English translation of Office Action dated Mar. 10, 2020, 14 pages.

* cited by examiner

METHOD FOR PROVIDING VEHICLE INFORMATION, DEVICE AND STORAGE MEDIUM

This application is based on and claims priority of Chinese Patent Application 201811280718.5, filed on Oct. 30, 2018, the entire contents of which are incorporated herein by reference.

FIELD

The present disclosure relates to an information interaction field, more particularly to a method for providing vehicle information, a device and a computer-readable storage medium.

BACKGROUND

When a vehicle is being driven on a road, it needs to interact with pedestrians and other vehicles on the road. Regardless of whether the current vehicle has an autonomous driving capability or not, the current vehicle typically transmits some vehicle information (such as an intention of the vehicle's driver, an alarm for possible emergency or the like) by means of driving actions of the vehicle, the vehicle's light and horn blowing. In a scene of supplementing energy (e.g., gasoline or electricity) for the vehicle, the efficiency of supplementing energy may be improved by providing vehicle information to the vehicle to be supplemented with energy, to other vehicles waiting to be supplemented with energy, or to an energy supplement station.

DISCLOSURE

Embodiments of the present disclosure provide a technical solution of providing vehicle information.

In a first aspect of the present disclosure, embodiments of the present disclosure provide a method for providing vehicle information, including: acquiring a first time period expected to wait before supplement of energy for a first vehicle to be commenced; determining a second time period expected to be required during the supplement of the energy for the first vehicle based on an amount of the energy to be supplemented for the first vehicle; determining a third time period expected to be required for completing the supplement of the energy for the first vehicle based on the first time period and the second time period; and providing the third time period.

In a second aspect of the present disclosure, embodiments of the present disclosure provide an apparatus for providing vehicle information, including: a first acquiring module, configured to acquire a first time period expected to wait before supplement of energy for a first vehicle; a first determining module, configured to determine a second time period expected to re quire during the supplement of the energy for the first vehicle based on an amount of the energy to be supplemented for the first vehicle; a second determining module, configured to determine a third time period expected to require for completing the supplement of the energy for the first vehicle based on the first time period and the second time period; and a providing module, configured to provide the third time period.

In a third aspect of the present disclosure, embodiments of the present disclosure provide a device, including one or more processors and a memory for storing one or more programs. When the one or more programs are executed by the one or more processors, the one or more processors are caused to perform the method according to embodiments of the first aspect.

In a fourth aspect, embodiments of the present disclosure provide a computer-readable storage medium having a computer program stored thereon. When the computer program is executed by a processor, the method according to embodiments of the first aspect is performed.

It should be understood that, the above summary of the present disclosure is intended to describe key or important features of the present disclosure but not to limit the scope of the present disclosure. Other features in the present disclosure will become apparent in part from the following descriptions.

BRIEF DESCRIPTION OF THE DRAWINGS

These and other aspects and advantages of embodiments of the present disclosure will become apparent and more readily appreciated from the following descriptions made with reference to the drawings. The same or similar elements and the elements having same or similar functions are denoted by like reference numerals in the drawings.

EMBODIMENTS OF THE PRESENT DISCLOSURE

Figure 1:
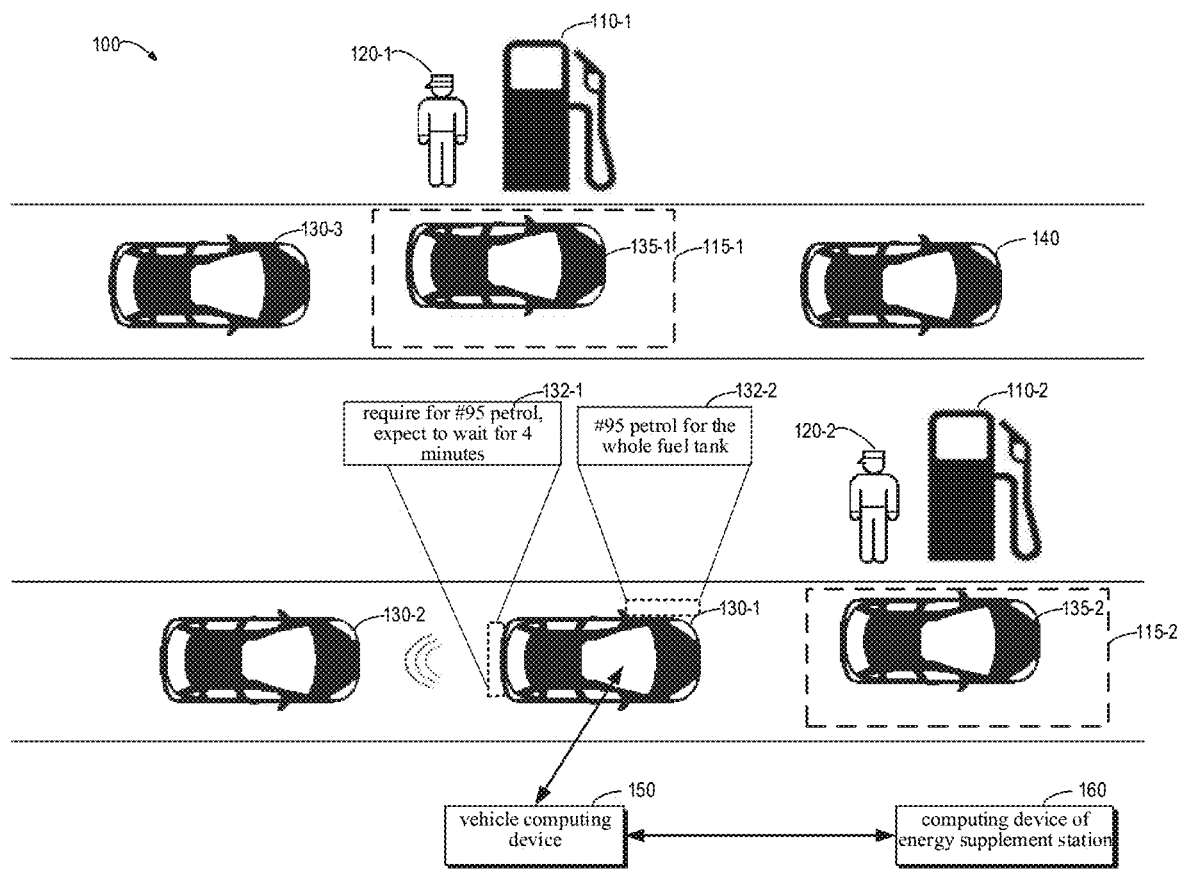
FIG. 1 is a schematic diagram of an example environment in which the embodiments of the present disclosure are realized.

Referring to the following descriptions and drawings, these and other aspects of the embodiments of the present disclosure will be apparent. In these descriptions and drawings, some specific approaches of the embodiments of the present disclosure are provided, so as to show certain ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure as defined by the claims.

It should be further understood that, when used in the specification, terms "comprising" and/or "containing" specify the presence of stated features, operations, elements and/or components, but do not exclude the presence or addition of one or more other features, operations, elements, components and/or groups thereof. Terms "based on" should be understood as "at least partially based on". Reference throughout this specification to "an embodiment," or "this example," means "at least one embodiment". Terms such as "first" and "second" are used herein for describing different or same elements. Other implicit or explicit definitions may be contained in the following.

As mentioned above, a vehicle needs to provide vehicle information to pedestrians external to the vehicle during driving of the vehicle. The current vehicle information is provided mainly based on a determination on environment external to the vehicle. The vehicle having an ability of automatically detecting the environment (such as an autonomous vehicle equipped with corresponding devices) may automatically detect the external environment where the vehicle and the pedestrians are located through a sensor to determine what kind of vehicle information needs to be provided. For example, the vehicle may determine whether to blow a horn by detecting whether a pedestrian appears on the road on which the vehicle is driving. However, in a scene of supplementing energy, the vehicle information determined purely based on the environment information acquired by the sensor is limited, such that it is difficult to provide the vehicle information (such as an intention to supplement energy for the vehicle or a time period required) to other vehicles to be supplemented with energy or staffs.

Recently, the autonomous driving technology gradually emerges. More and more enterprises carry out development and production on the autonomous driving technology. It may be anticipated that many autonomous vehicles may appear on road in the future. Drivers will not be needed for the autonomous vehicles, and in such scene of supplementing energy, a requirement may be not satisfied by providing the vehicle information merely based on perceptual information of surrounding environment acquired by the sensor of the autonomous vehicle.

According to embodiments of the present disclosure, a technical solution of providing vehicle information is proposed. In this technical solution, a first time period expected to wait before supplement of energy for a first vehicle is acquired and a second time period expected to be required during the supplement of the energy for the first vehicle is determined based on an amount of the energy to be supplemented for the first vehicle. Further, a third time period expected to be required for completing the supplement of the energy for the first vehicle is determined based on the first time period and the second time period. Then, the vehicle is informed of the third time period. Base on the technical solution of the present disclosure, the time required for queuing up for supplement of energy for the vehicle can be acquired, and a total expected wait time may be provided to other vehicles by estimating the time required during the supplement of energy for the vehicle, such that other vehicles may know exactly how long it will take for the supplement of energy for the vehicles ahead of them and may change to another energy supplement station if necessary.

In the following, the embodiments of the present disclosure will be described in detail with reference to the drawings. FIG. 1 shows a schematic diagram of an example environment 100 in which the embodiments of the present disclosure are realized. In the example environment 100, one or more vehicles 135-1 and 135-2 are being supplemented with energy in energy supplement areas 115-1 and 115-2, one or more vehicles 130-1, 130-2 and 130-3 are queuing up for supplement of energy, and one or more vehicles 140 have completed the supplement of energy and are going to leave the energy supplement station. The example environment 100 further shows one or more energy supplement devices 110-1 and 110-2, and one or more staffs 120-1 and 120-2 assisting the vehicle to supplement with energy. For ease of description, many vehicles 135-1 and 135-2 which are being supplemented with energy are collectively called as an energy-supplement-concurring vehicle 135, many vehicles 130-1, 130-2 and 130-3 which are queuing up for the supplement of energy are collectively called as a queuing vehicle 130, many energy supplement devices 110-1 and 110-2 are collectively called as an energy supplement device 110, and many staffs 120-1 and 120-2 are collectively called as a staff 120. It should be understood that, infrastructures and objects shown in FIG. 1 are merely examples. According to actual situations, the objects in different traffic environments may be changed, which are not limited herein.

In the example of FIG. 1, the vehicles 130, 135 and/or 140 may be any type of vehicle capable of carrying people and/or item and moving through a power system such as an engine, including but not limited to a car, a truck, a bus, an electric car, a motorbike, a limousine, a train or the like. One or more vehicles 130, 135 and/or 140 in the environment 100 may be a vehicle having a certain autonomous driving ability, which may be called as the autonomous vehicle. One or more vehicles 130, 135 and/or 140 in the environment 100 may be a vehicle without the autonomous driving ability.

The vehicle 130 may be coupled to a vehicle computing device 150 communicatively. Although the vehicle computing device 150 is illustrated as a single entity, the vehicle computing device 150 may be embodied in the vehicle 130. The vehicle computing device 150 may be an entity external to the vehicle 130, and may communicate with the vehicle 130 via a wireless network. The vehicle computing device 150 may be implemented as one or more computing devices, at least including a processor, a storage and other components generally existing in a general-purpose computer so as to realize functionalities such as computing, storage, communication, control or the like.

The vehicle computing device 150 may be coupled to a computing device 160 of the energy supplement station communicatively so as to receive information on the energy supplement station from the computing device 160 of the energy supplement station. For example, the computing device 160 of the energy supplement station may broadcast price information for the supplement of energy, position information of each energy supplement device, average time consumption of supplementing energy for the vehicle or the like to the vehicle computing device 150.

It should be understood that, the environment 100 illustrated in FIG. 1 is merely a specific example. According to actual situations, more or less, or different objects may exist in the environment 100. For example, one or more configurations of a road for driving of the vehicle, positions and a number of the vehicles on the road, positions and a number of energy supplement devices may be different. The vehicle information 132-1 and 132-2 illustrated in FIG. 1 is merely a specific example. The vehicle 130 may output other vehicle information in other ways.

In some embodiments, the supplement of energy mentioned herein may refer to supplementing fuel such as various kinds of petrol, diesel or natural gas required by the vehicle 130, 135 and/or 140. In this case, the energy supplement device 110 may be a fuel truck nozzle. In some embodiments, the supplement of energy may also refer to supplementing electric energy required by the vehicle 130, 135 and/or 140. In this case, the energy supplement device 110 may be a charging pile.

If the vehicle 130-1 is queuing up for the supplement of energy, the vehicle information 132-2 is required to be provided to the staff 120-2 so as to inform the staff 120-2 of the type and amount of energy expected to be supplemented for the vehicle. For example, in the example of FIG. 1, the vehicle 130-1 utilizes a front-left side screen to display the vehicle information 132-2 which includes "#95 petrol for the whole fuel tank". In addition, the vehicle 130-1 needs to provide the vehicle information 132-1 to other vehicles such as the vehicle 130-2 in the queue. For example, in the example of FIG. 1, the vehicle 130-1 utilizes a rear-side screen to display the vehicle information 132-1 which includes "require for #95 petrol, expect to wait for 4 minutes". In this way, the vehicle 130-2 in the queue may know the time period expected to queue up for the supplement of energy in advance and may determine whether to change to a distinct energy supplement device 110 or even change to another energy supplement station.

Figure 2A:
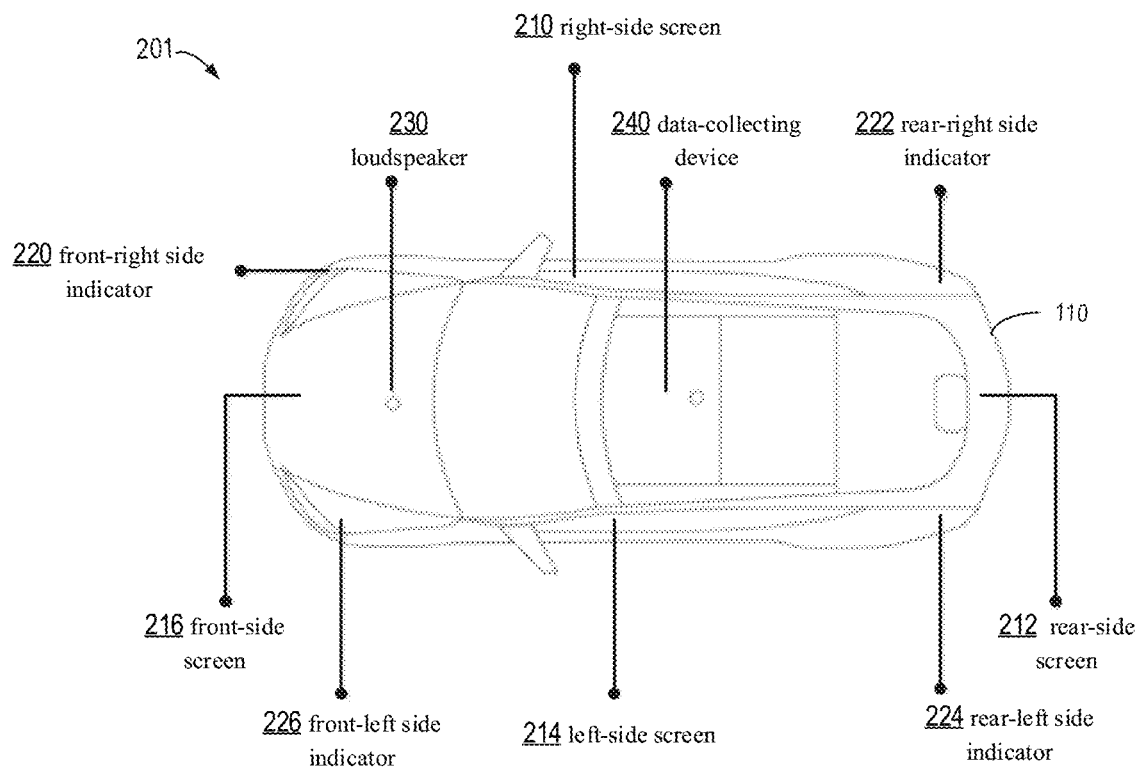
FIG. 2A is a top view of an example vehicle according to embodiments of the present disclosure.

Detail content and presentation of the vehicle information 132 may further depends on a specific hardware configuration of the vehicle 130. Before describing the embodiments of the present disclosure in detail, an example of the hardware configuration of the vehicle 130 is explained with reference to FIGS. 2A-2C. FIG. 2A is a top view 201 of an example of the vehicle 130 according to embodiments of the present disclosure. In this example, the vehicle 130 includes one or more display screens external to the vehicle. The display screen may include a left-side screen 210 and a right-side screen 214 installed on lateral sides of the vehicle 130, a rear-side screen 212 installed on a rear side of the vehicle 130, and a front-side screen 216 installed on a front side of the vehicle 130. The rear-side screen 212 may be clearly observed from a back view 202 of the vehicle 130 illustrated in FIG. 2B. The display screen may be any type of screen capable of displaying the vehicle information such as text, picture and/or animation. Additionally or alternatively, besides the screen illustrated in FIG. 2A, one or more other screens may be installed at other positions of the vehicle 130.

Figure 2B:
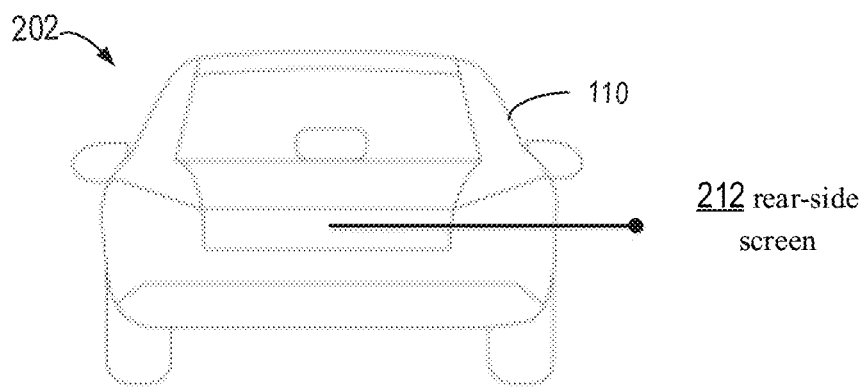
FIG. 2B is a back view of an example vehicle according to embodiments of the present disclosure.
Figure 2C:
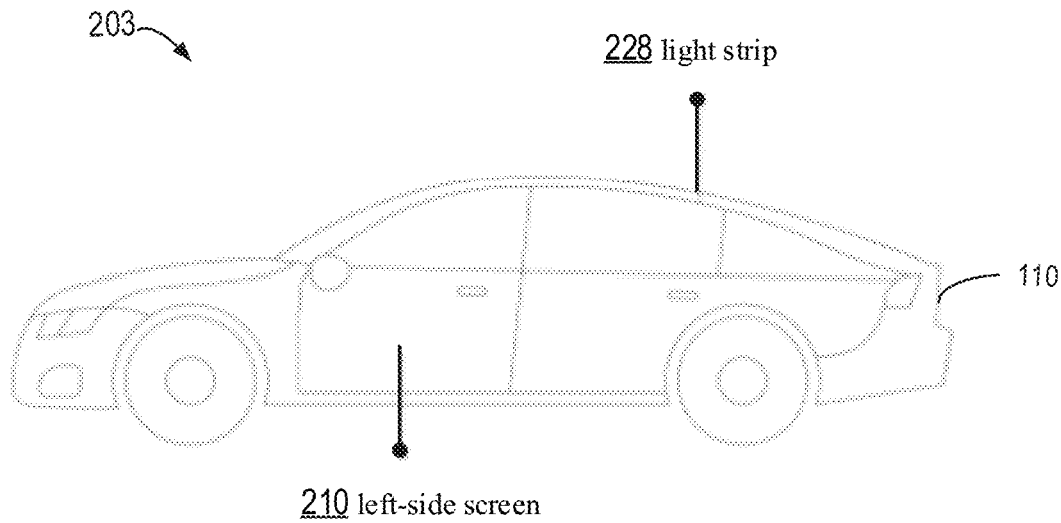
FIG. 2C is a lateral view of an example vehicle according to embodiments of the present disclosure.

It can be seen from the top view 201 of the FIG. 2A, the vehicle 130 may further include one or more indicators configured to emit light. The indicators may be located at different positions of the vehicle 130, such as a front-right side indicator 220, a rear-right side indicator 222, a rear-left side indicator 224 and a front-left side indicator 226 illustrated in FIG. 2A. The indicators 220, 222, 224 and 226 for example may be configured as ray lights. The vehicle 130 may further include other types of lights. For example, FIG. 2C depicts a lateral view 203 of the vehicle 130. From the lateral view 203, besides the lateral-side screen such as left-side screen 210 of the vehicle 130, streamlined light strip 228 installed on the lateral sides of the vehicle 130 can also be seen. The indicator including the ray light, the light strip may be configured as any type of light capable of outputting feedback information in the form of light.

The vehicle 130 may further include one or more loudspeakers. Returning to FIG. 2A, the loudspeaker 230 is located at the forepart of the vehicle 130. It should be understood that, one or more loudspeakers may be located at other positions of the vehicle 130. The loudspeaker 230 may be configured to output audible vehicle information.

In addition to a device configured to output information, the vehicle 130 may further include one or more devices configured to collect data external to the vehicle, such as a data-collecting device 240 at the top of the vehicle 130. The data-collecting device 240 may be an image capturing device (such as a camera) and/or other types of sensors configured to detect data. It should be understood that, one or more data-collecting devices may be located at other positions of the vehicle 130.

An example of the hardware configuration of the vehicle 130 is described with reference to FIGS. 2A-2C. However, depending on a type of a specific configuration of the vehicle 130, types, a number and an arrangement form of the hardware devices configured to output the vehicle information and collect data may be modified, which are not limited herein.

Figure 3:
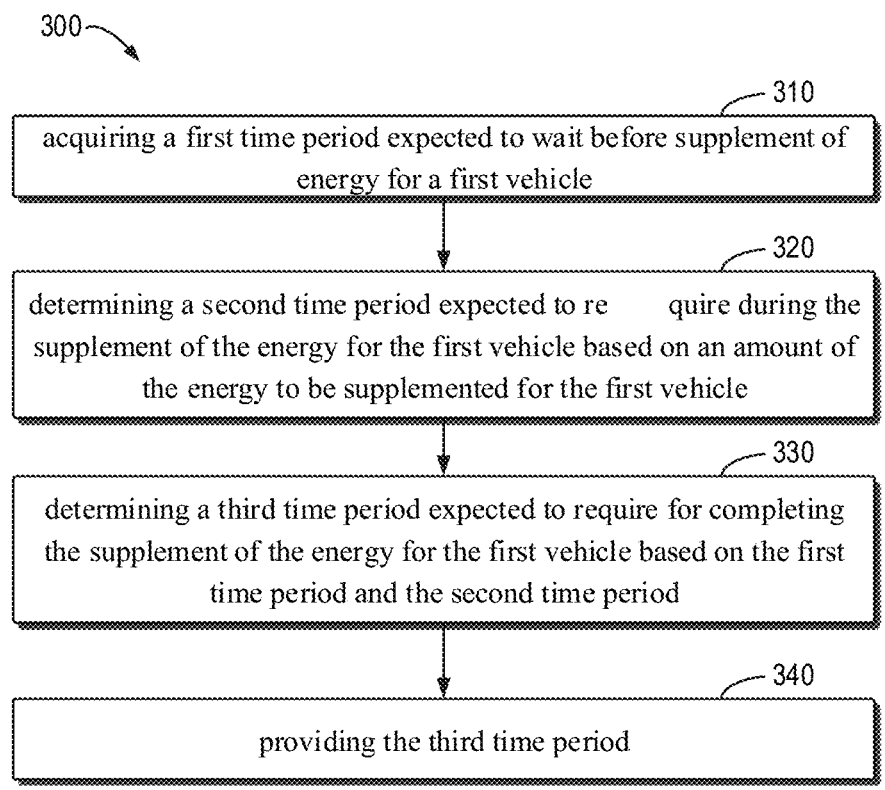
FIG. 3 is a flow chart of a method for providing vehicle information according to embodiments of the present disclosure.

In the following text, methods of controlling the vehicle 130-1 queuing up for the supplement of energy to provide the vehicle information 132 will be described in detail with reference to FIG. 3. FIG. 3 is a flow chart of a process 300 for providing vehicle information according to embodiments of the present disclosure. The process 300 may be executed by the vehicle computing device 150 illustrated in FIG. 1, the vehicle computing device 150 may be embodied in the vehicle 130-1 or may be a single device external to the vehicle 130-1. For ease of description, the process 300 will be described with reference to FIG. 1.

At block 310, the vehicle computing device 150 acquires a time period (for ease of description, hereinafter, referred to as "first time period") expected to wait by the vehicle 130-1 before the supplement of energy. In some embodiments, the vehicle computing device 150 may receive from a preceding vehicle in front of the vehicle 130-1 a time consumption expected to complete the supplement of energy by the preceding vehicle. Taking FIG. 1 as an example, the preceding vehicle in front of the vehicle 130-1 refers to the vehicle 135-2 being supplemented with energy. The vehicle 135-2 may calculate the time required for completing the supplement of energy based on the required amount of energy to be supplemented and an expected speed of supplementing energy and may inform the vehicle 130-1 of the time.

In some embodiments, the vehicle 135-2 may simply broadcast the time to other vehicles. The vehicle 135-2 may also put identification information (such as information on license plate) of the vehicle 135-2 in the broadcast information. In this way, the vehicle computing device 150 may receive the broadcast information, determine the time consumption issued by the preceding vehicle 135-2 by identifying the license plate of the preceding vehicle 135-2, and then determine the first time period based on the time consumption.

In some embodiments, the vehicle 135-2 may also utilize the rear-side screen of the vehicle to display the time consumption. In this way, the vehicle computing device 150 may determine the time consumption displayed on the rear-side screen of the vehicle 135-2 by means of an image recognition technology, and determine the first time period based on the time consumption.

In some embodiments, the vehicle computing device 150 may receive an estimate of the first time period from the computing device 160 of the energy supplement station. In detail, in a process that the vehicle 130-1 is driving or queuing up, the vehicle computing device 150 may determine whether the vehicle 130-1 is within a predetermined area of the energy supplement station. In some embodiments, the vehicle computing device 150 may determine whether the vehicle 130-1 is within the predetermined area of the energy supplement station based on position information of the vehicle 130-1 and position information of the energy supplement station. In some embodiments, the vehicle computing device 150 may determine that the vehicle 130-1 is within the predetermined area of the energy supplement station in response to receiving a broadcast signal from the computing device 160 of the energy supplement station. It should be understood that, other appropriate technologies may be used to determine whether the vehicle 130-1 is in the vicinity of the energy supplement station. For example, it may be determined that the vehicle 130-1 is in the vicinity of the energy supplement station through a predetermined interaction performed by a user (passenger or driver), or when an identification related to the energy supplement station is detected through an image recognition technology. By determining whether the vehicle 130-1 is in the vicinity of the energy supplement station, the vehicle computing device 150 may avoid unnecessary computing consumption.

In some embodiments, in response to determining that the vehicle 130-1 is within the predetermined area of the energy supplement station, the vehicle computing device 150 may determine whether the vehicle 130-1 is in an energy-supplement waiting state. In detail, the vehicle computing device 150 may determine that the vehicle 130-1 completes the supplement of energy based on an amount of energy of the vehicle 130-1 greater than a predetermined threshold. Thereafter, the vehicle computing device 150 may determine that the vehicle is being supplemented with energy based on varying amount of energy of the vehicle 130-1.

In some embodiments, in response to determining that the vehicle 130-1 is in the energy-supplement waiting state, the vehicle computing device 150 may receive the first time period from the energy supplement station. In some embodiments, the computing device 160 of the energy supplement station may acquire the type of energy expected by the vehicle 130-1 from the vehicle computing device 150. For example, referring to the example of FIG. 1, the vehicle 130-1 requires for #95 petrol.

Based on the type of energy, the computing device 160 of the energy supplement station may acquire a historic average time consumption of the vehicle requiring for this type of energy in the energy supplement station. For example, the computing device 160 of the energy supplement station may acquire an average value of a preceding hour, or may acquire the average time consumption of the same time (for example, an hour) in one week or several days as the current time. In some embodiments, the computing device 160 of the energy supplement station may, for example, determine that the average time consumption of the vehicle requiring for #95 petrol in the energy supplement station within a predetermined time period is 15 minutes, wherein the average time consumption for queuing up is 13 minutes and the average time consumption for supplementing with petrol is 2 minutes. In this case, the computing device 160 of the energy supplement station may determine that the vehicle 130-2 has waited for 5 minutes in the queue, and may determine that the vehicle 130-2 should wait for another 8 minutes in the queue. Then, the time information 8 minutes is configured as the time consumption expected for queuing up to be sent to the vehicle computing device 150.

In some embodiments, the vehicle computing device 150 may further send the current position of the vehicle 130-1 to the computing device 160 of the energy supplement station. Alternatively, the vehicle computing device 150 may send the identification information of the vehicle 130-1 to the computing device 160 of the energy supplement station. Based on the identification information, the computing device 160 of the energy supplement station may determine the position of the vehicle 130-1 in the energy supplement station. In some embodiments, the computing device 160 of the energy supplement station may identify the preceding vehicle in front of the vehicle 130-1 in the queue and acquire the time consumption expected for supplementing energy. Using FIG. 1 as an example, the computing device 160 of the energy supplement station may receive the time consumption (for example, 2 minutes) expected for supplementing energy of the vehicle 135-2 from the energy supplement device 110-2, and send the time consumption to the vehicle computing device 150 as the time consumption expected for queuing up.

At block 320, the vehicle computing device 150 determines a time period (for ease of description, hereinafter, referred to as "second time period") expected to re quire during the supplement of energy of the vehicle 130-1 based on an amount of energy to be supplemented for the vehicle 130-1. In some embodiments, the vehicle computing device 150 may determine the amount of energy to be supplemented based on the remaining energy of the vehicle 130-1, for example, the amount of energy required for filling up the fuel tank. In some embodiments, the vehicle computing device 150 may also receive the amount of energy to be supplemented which is determined through an interaction between the user (passenger or driver) with the vehicle 130-1. In some embodiments, the vehicle computing device 150 may also determine an expected energy consumption based on an expected driving plan of the vehicle 130-1 and determine the amount of energy to be supplemented based on the expected energy consumption.

In some embodiments, the vehicle computing device 150 may acquire a speed of supplementing the certain type of energy by querying on network or receiving from the computing device 160 of the energy supplement station. For example, the vehicle computing device 150 may determine the speed of supplementing #95 petrol in the energy supplement station is 20 L per minute.

In some embodiments, the vehicle computing device 150 may estimate the time consumption expected for the supplement of energy based on the amount of energy to be supplemented and the speed of supplementing energy. For example, when the vehicle 130-1 needs to be supplemented with 40 L of #95 petrol and the speed of supplementing #95 petrol is 20 L per minute, the vehicle computing device 150 may determine that the second time period is 2 minutes.

At block 330, the vehicle computing device 150 determines a time period (for ease of description, hereinafter, referred to as "third time period") expected to require for completing the supplement of energy for the vehicle 130-1 based on the first time period and the second time period. In some embodiments, after the first time period and the second time period are determined, the vehicle computing device 150 may sum the first time period and the second time period up to acquire the third time period expected to require for completing the supplement of energy for the vehicle 130-1. In some embodiments, the vehicle computing device 150 may estimate a time consumption for operations of the staff and a time consumption for preparation operations for supplementing the vehicle with energy, and compute the third time period by taking them into account.

At block 340, the vehicle computing device 150 informs of the third time period. In some embodiments, the vehicle computing device 150 may inform the vehicle 130-2 different from the vehicle 130-1 of the third time period. In some embodiments, the vehicle computing device 150 may inform the vehicle 130-2 of the vehicle information related to the third time period through the rear-side screen 212 of the vehicle 130-1. For example, in the example of FIG. 1, the vehicle 130-1 utilizes the rear-side screen to display the vehicle information 132-1, which includes "require for #95 petrol, expect to wait for 4 minutes". In some embodiments, the vehicle computing device 150 may inform the vehicle 130-2 of the vehicle information related to the third time period by means of broadcast. In some embodiments, the broadcast information may include the identification information (such as information on license plate) of the vehicle 130-1, such that another vehicle 130-2 may determine the sender of information. In some embodiments, the vehicle computing device 150 may also send the third time period to the computing device 160 of the energy supplement station via wireless communication, such that the computing device 160 of the energy supplement station may monitor status of each vehicle in the station based on the information and estimate the time required to wait by the vehicle.

Based on the technical solution of the present disclosure, the vehicle 130-1 may inform other vehicles (such as the vehicle 130-2) in the queue of the estimate of time consumption for supplementing energy, such that the vehicle 130-2 may make a reasonable arrangement to determine whether to wait in the current queue or to change to another energy supplement device or even to change to another energy supplement station. In addition, the vehicle 130-1 may also send the information to the energy supplement station, such that the energy supplement station may send the expected wait time to other vehicles.

In some embodiments, when the vehicle computing device 150 determines that there is no vehicle in front of the vehicle 130-1 in the queue, the vehicle computing device 150 may control the vehicle 130-1 to drive to the vicinity of a target energy supplement device 110-2 for supplementing with energy. In detail, the vehicle computing device 150 may determine the target energy supplement device matched the vehicle 130-1 from at least energy supplement device in the energy supplement station. For example, the vehicle computing device 150 may determine the type (such as #95 petrol) of energy to be supplemented for the vehicle 130-1 according to a model of the vehicle 130-1. In some embodiments, the vehicle computing device 150 may determine the target energy supplement device 110-2 matched the vehicle 130-1 from several energy supplement devices 110 through an image recognition technology. In some embodiments, the vehicle computing device 150 may receive information (for example, a model, a speed of supplementing energy and a physical position of the energy supplement station) on the energy supplement device 110 from the computing device 160 of the energy supplement station. In some embodiments, the vehicle computing device 150 may receive related information from the energy supplement device 110 directly and determine the matched target energy supplement device 110-2.

In some embodiments, after the target energy supplement device 110-2 is determined, when the vehicle computing device 150 determines that there is not vehicle in front of the vehicle 130-1 in the queue, the vehicle computing device 150 may determine based on a current position of the vehicle 130-1 and a target position of the target energy supplement device 110-2 a driving path from the current position to the target position. The vehicle computing device 150 may control the vehicle 130-1 to drive to the target position 115-2 in the vicinity of the target energy supplement device for supplanting with energy based on the driving path.

In some embodiments, the vehicle computing device 150 may also utilize one or more sensors installed on the vehicle 130-1 to acquire at least one instruction from a personnel external to the vehicle 130-1. In some embodiments, the vehicle computing device 150, for example, may receive a speech instruction (such as "go forward", "park the vehicle", "drive on the left" or the like) of the staff 120-2 illustrated in FIG. 1 through a speech sensor (for example, microphone).

In some embodiments, the vehicle computing device 150, for example, may utilize one or more image sensors (for example, camera) of the vehicle 130-1 to receive an image of the staff 120-2 through an image recognition technology and recognize the staff 120-2 from the image. It should be understood that, the staff 120-2 may be recognized based on captured dress features and/or action features of one or more persons, so as to avoid interference from other drivers or passengers. In some embodiments, the vehicle computing device 150 may subsequently receive one or more body action instructions (for example, stretching out the right hand, making the palm to face upward) of the staff 120-3 through the image recognition technology.

In some embodiments, based on at least one instruction, the vehicle computing device 150 may control the vehicle 130-1 to drive to the target position 115-2 in the vicinity of the target energy supplement device 110-2 for supplanting with energy. In some embodiments, based on the acquired speech instruction, the vehicle computing device 150 may transform the speech instruction into text based on a speech recognition technology and further transform the text into the instruction for controlling the vehicle 130-1. In some embodiments, for the acquired body action, the vehicle computing device 150 may establish a mapping table between body actions and operating instructions, for example, "stretching out the right hand, making the palm to face upward" means to parking the vehicle, and then control the vehicle 130-1 to drive the predetermined area based on the mapping table.

In some embodiments, as illustrated in FIG. 1, when the vehicle 130-1 drives to the target position 115-2 for supplanting with energy, the vehicle computing device 150 may further utilize the left-side screen of the vehicle 130-1 to display the vehicle information 132-2, for example, "#95 petrol for the whole fuel tank".

Figure 4:
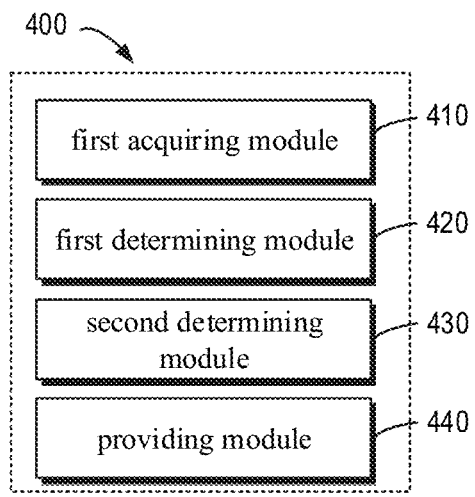
FIG. 4 is a block diagram of an apparatus for providing vehicle information according to embodiments of the present disclosure.

FIG. 4 is a block diagram of an apparatus 400 for providing vehicle information according to embodiments of the present disclosure. The apparatus 400 may be included in the vehicle computing device 150 shown in FIG. 1 or may be implemented as the vehicle computing device 150. As illustrated in FIG. 4, the apparatus 400 includes a first acquiring module 410, configured to acquire a first time period expected to wait before supplement of energy for a first vehicle. The apparatus 400 further includes a first determining module 420, configured to determine a second time period expected to re quire during the supplement of the energy for the first vehicle based on an amount of the energy to be supplemented for the first vehicle. The apparatus 400 further includes a second determining module 430, configured to determine a third time period expected to require for completing the supplement of the energy for the first vehicle based on the first time period and the second time period. The apparatus 400 further includes a providing module 440, configured to provide the third time period.

In some embodiments, the first acquiring module 410 may include: a third determining module, configured to, in response to determining that the first vehicle is located in a predetermined area of an energy supplement station, determine whether the first vehicle is in an energy-supplement waiting state; and a receiving module, configured to, in response to determining that the first vehicle is in the energy-supplement waiting state, receive the first time period from the energy supplement station.

In some embodiments, the first time period is determined based on at least one of: a current position of the first vehicle, a historic average time consumption of the first vehicle in the energy supplement station, and a type of the energy to be supplemented for the first vehicle.

In some embodiments, the providing module 440 may include: a providing unit, configured to provide the third time period to at least one of a second vehicle different from the first vehicle and the energy supplement station.

In some embodiments, the apparatus 400 may further include: a fourth determining module, configured to determine a target energy supplement device matched the first vehicle from at least one energy supplement device in the energy supplement station.

In some embodiments, the apparatus 400 may further include: a fifth determining module, configured to determine a driving path from the first vehicle to the target energy supplement device; and a first controlling module, configured to control the first vehicle to drive to a target position in the vicinity of the target energy supplement device for supplementing the energy based on the driving path.

In some embodiments, the apparatus 400 may further include: a second acquiring module, configured to acquire an instruction from a personnel external to the first vehicle; and a second controlling module, configured to control the first vehicle to drive to a target position in the vicinity of the target energy supplement device for supplementing the energy based on the instruction.

Figure 5:
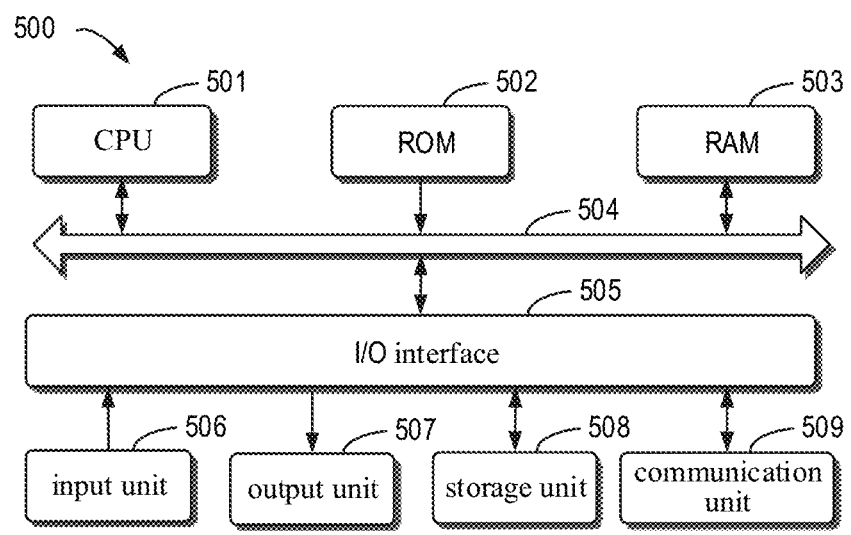
FIG. 5 is a schematic diagram of a computing device according to embodiments of the present disclosure.

FIG. 5 is a schematic diagram of a device 500 according to embodiments of the present disclosure. The device 500 may be used to implement the vehicle computing device 150 shown in FIG. 1. As illustrated in FIG. 5, the device 500 includes a central processing unit (CPU) 501 that may perform various appropriate actions and processing according to computer program instructions stored in a read-only memory (ROM) 502 or computer program instructions loaded into a random access memory (RAM) 503 from a storage unit 508. The RAM 503 may further store various programs and data required for the operation of the device 500. The computing unit 501, the ROM 502 and the RAM 503 are connected to each other via a bus 504. An input/output (I/O) interface 505 is also connected to the bus 504.

A plurality of components in the device 500 are connected to the I/O interface 505, including an input unit 506, such as a keyboard, a mouse or the like; an output unit 507, such as various types of displays, loudspeakers or the like; the storage unit 508, such as a magnetic disk, an optical disk or the like; and a communication unit 509, such as a network card, a modem, a wireless communication transceiver or the like. The communication unit 509 allows the device 500 to exchange information/data with other devices over a computer network such as the Internet and/or various telecommunication networks.

The processing unit 501 performs the various methods (such as process 300) and processes described above. For example, in some embodiments, the process 300 may be implemented as computer software programs, which are tangibly embodied in a machine-readable medium, for example the storage unit 508. In some embodiments, some or all of the computer programs may be loaded and/or installed onto the device 500 through the ROM 502 and/or the communication unit 509. When the computer programs are loaded into the RAM 503 and executed by the computing unit 501, one or more steps of the above-mentioned process 300 may be performed. Alternatively, in other embodiments, the CPU 501 may be configured to perform the process 300 by any other appropriate means (for example, by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical storage device, magnetic storage device, or any suitable combination of the foregoing.

In addition, although operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for providing vehicle information, comprising:

in response to determining that a first vehicle is located in a predetermined area of an energy supplement station, acquiring by a vehicle computing device communicatively coupled to the first vehicle, a first time period expected for the first vehicle to wait from the energy supplement station before supplement of energy for the first vehicle is to be commenced;

determining by the vehicle computing device, a second time period expected to be required during the supplement of the energy for the first vehicle based on an amount of the energy to be supplemented for the first vehicle;

determining by the vehicle computing device, a third time period expected to be required for completing the supplement of the energy for the first vehicle based on the first time period and the second time period; and providing by the vehicle computing device, the third time period to a second vehicle behind the first vehicle and/or the energy supplement station;

wherein the first time period is determined based on a historic average time consumption of a third vehicle in the energy supplement station, in which the third vehicle has a type of energy same as the first vehicle; and/or time consumption expected for supplementing energy of a vehicle in front of a current position of the first vehicle.

2. The method of claim 1, wherein, acquiring the first time period comprises:

determining whether the first vehicle is in an energy-supplement waiting state; and in response to determining that the first vehicle is in the energy-supplement waiting state, receiving the first time period from the energy supplement station.

3. The method of claim 1, further comprising:

determining a target energy supplement device matched the first vehicle from at least one energy supplement device in the energy supplement station.

4. The method of claim 3, further comprising:

determining a driving path from the first vehicle to the target energy supplement device; and controlling the first vehicle to drive to a target position in the vicinity of the target energy supplement device for supplementing the energy based on the driving path.

5. The method of claim 3, further comprising:

acquiring an instruction from a personnel external to the first vehicle; and controlling the first vehicle to drive to a target position in the vicinity of the target energy supplement device for supplementing the energy based on the instruction.

6. An electronic device, comprising:

one or more processors;

a memory for storing one or more programs;

wherein when the one or more programs are executed by the one or more processors, the one or more processors are caused to perform:

in response to determining that a first vehicle is located in a predetermined area of an energy supplement station, acquiring a first time period expected for the first vehicle to wait from the energy supplement station before supplement of energy for the first vehicle is to be commenced;

determining a second time period expected to be required during the supplement of the energy for the first vehicle based on an amount of the energy to be supplemented for the first vehicle;

determining a third time period expected to be required for completing the supplement of the energy for the first vehicle based on the first time period and the second time period; and providing the third time period to a second vehicle behind the first vehicle and/or the energy supplement station;

wherein the first time period is determined based on a historic average time consumption of a third vehicle in the energy supplement station, in which the third vehicle has a type of energy same as the first vehicle; and/or time consumption expected for supplementing energy of a vehicle in front of a current position of the first vehicle.

7. The electronic device of claim 6, wherein, acquiring the first time period comprises:

determining whether the first vehicle is in an energy-supplement waiting state; and in response to determining that the first vehicle is in the energy-supplement waiting state, receiving the first time period from the energy supplement station.

8. The electronic device of claim 6, wherein the one or more processors are caused to perform:

determining a target energy supplement device matched the first vehicle from at least one energy supplement device in the energy supplement station.

9. The electronic device of claim 8, wherein the one or more processors are caused to perform:

determining a driving path from the first vehicle to the target energy supplement device; and controlling the first vehicle to drive to a target position in the vicinity of the target energy supplement device for supplementing the energy based on the driving path.

10. The electronic device of claim 8, wherein the one or more processors are caused to perform:

acquiring an instruction from a personnel external to the first vehicle; and controlling the first vehicle to drive to a target position in the vicinity of the target energy supplement device for supplementing the energy based on the instruction.

11. A computer-readable storage medium having a computer program stored thereon, wherein, when the computer program is executed by a processor, the processor performs the method for providing vehicle information, comprising:

in response to determining that a first vehicle is located in a predetermined area of an energy supplement station, acquiring the first time period expected to wait from the energy supplement station before supplement of energy for a first vehicle;

determining a second time period expected to re quire during the supplement of the energy for the first vehicle based on an amount of the energy to be supplemented for the first vehicle;

determining a third time period expected to require for completing the supplement of the energy for the first vehicle based on the first time period and the second time period; and providing the third time period to a second vehicle behind the first vehicle and/or the energy supplement station;

wherein the first time period is determined based on a historic average time consumption of a third vehicle in the energy supplement station, in which the third vehicle has a type of energy same as the first vehicle; and/or time consumption expected for supplementing energy of a vehicle in front of a current position of the first vehicle.

12. The storage medium of claim 11, wherein, acquiring the first time period comprises:

determining whether the first vehicle is in an energy-supplement waiting state; and in response to determining that the first vehicle is in the energy-supplement waiting state, receiving the first time period from the energy supplement station.

13. The storage medium of claim 11, wherein the method further comprises:

determining a target energy supplement device matched the first vehicle from at least one energy supplement device in the energy supplement station.

14. The storage medium of claim 13, wherein the method further comprises:
determining a driving path from the first vehicle to the target energy supplement device; and
controlling the first vehicle to drive to a target position in the vicinity of the target energy supplement device for supplementing the energy based on the driving path.

* * * * *